United States Patent [19]

Harms et al.

[11] Patent Number: 4,726,682

[45] Date of Patent: Feb. 23, 1988

[54] DEPTH MEASURING APPARATUS FOR A DREDGER

[75] Inventors: Paul Harms, Hadamar; Willibald Sehr, Waldbrunn-Ellar, both of Fed. Rep. of Germany

[73] Assignee: MOBA-Electronic Gesellschaft fur Mobil-Automation MbH, Hadamar, Fed. Rep. of Germany

[21] Appl. No.: 827,081

[22] Filed: Feb. 7, 1986

[30] Foreign Application Priority Data

Feb. 22, 1985 [DE] Fed. Rep. of Germany ....... 3506326

[51] Int. Cl.$^4$ .............................................. G01B 11/22
[52] U.S. Cl. .............................. 356/375; 37/DIG. 19; 356/72
[58] Field of Search ................... 356/4, 372, 375, 400, 356/72; 37/80 R, DIG. 1, DIG. 19, DIG. 20

[56] References Cited

U.S. PATENT DOCUMENTS 4,034,490 7/1977 Teach .................................... 356/400

FOREIGN PATENT DOCUMENTS 2605139 9/1980 Fed. Rep. of Germany .
3219119 12/1982 Fed. Rep. of Germany .

Primary Examiner—F. L. Evans
Attorney, Agent, or Firm—Kinzer, Plyer, Dorn, McEachran & Jambor

[57] ABSTRACT

The invention relates to a depth measuring apparatus for a dredger, comprising an inclination sensor mounted on the dredger arm, a receiver for receiving a radiation establishing a reference level, and an evaluation circuit connected to the receiver and to the inclination sensor. In a known measuring apparatus of this type, the receiver merely serves for calibrating a pressure sensor operative to indicate the position of the dredger arm relative to the body of the dredger. According to the invention, for improving the measuring accuracy the receiver is itself operable to determine the position of the radiation determining the reference level relative to the receiver, the thus obtained information being employed together with the inclination signal for determining the operating depth of the dredger scoop.

5 Claims, 2 Drawing Figures

DEPTH MEASURING APPARATUS FOR A DREDGER

DESCRIPTION

The present invention relates to a depth measuring apparatus for a dredger.

Already known from DE-OS No. 32 19 119 is a depth measuring apparatus for a dredger, comprising an inclination sensor mounted on the dredger arm for generating an inclination signal indicative of the inclination of the dredger arm, a receiver for a radiation establishing a reference level, and an evaluation circuit connected to said receiver and to said inclination sensor. This known depth measuring apparatus includes a liquid-filled tube extending between a liquid reservoir in the operator's cabin of the dredger and a pressure sensor secured to the dredger arm. The pressure sensor generates an electric signal indicative of the height of the liquid reservoir above the level of the pressure sensor. This signal is applied to an evaluation circuit. Also mounted on the dredger arm is an inclination sensor for generating an inclination signal indicative of the inclination of that part of the dredger arm connected to the dredger scoop. The pressure sensor is mounted on the same part of the dredger arm. Additionally mounted on the dredger arm is a receiver for a laser radiation, which according to the reference cited may be positioned at any location of the dredger arm. A laser transmitter installed at a geometrically established location of the worksite at which the dredger comprising the known depth measuring apparatus is operated is operative to establish a reference level with its radiation. For calibrating the known depth measuring apparatus, the dredger arm is brought to a position at which a small sensing area of the receiver for the radiation establishing the reference level lies within the range of the laser radiation. In this position of the dredger arm, the known depth measuring apparatus is calibrated by actuating a calibrating push button to thereby store the output signal of the pressure sensor as a reference signal indicative of the respective position of the dredger arm with respect to the reference level. Subsequent to this calibrating operation, the depth of the dredger scoop relative to the reference level is determined by evaluating the deviation of the pressure sensor output signal from the pressure sensor output signal at the reference level, and by evaluating the inclination sensor output signal. In practical use, however, the employ of the known depth measuring apparatus has been found to be problematic, as subsequent to the initial calibrating operation a reliable information as to the depth of the dredger scoop attained in the course of the dredging operations can be obtained only if the dredger itself remains at the same level during its operation. Anybody having practical experience in the field of civil engineering is aware of the fact, however, that a dredger practically never operates on completely level ground. The reason of errors in determining the depth of the dredger scoop lies in the fact that the pressure sensor signal, which is directly introduced into the depth calculation, merely indicated the position of the pressure sensor relative to the operator's cabin of the dredge, so that any vertical displacements of the dredge as a whole, resulting from its travelling back and forth on a not exactly horizontal surface, directly lead to measuring errors. For providing a continuous accumulation of such measuring errors, the known depth measuring apparatus has to be frequently recalibrated during operation of the dredge.

Known from DE-PS No. 26 05 139 is an apparatus for measuring and indicating the digging position of the scoop of a deep scoop dredge. The known apparatus operates with two gravity-responsive inclination angle sensors mounted respectively on the boom and on the scoop arm. The measured angles are supplied to an evaluation circuit operative to determine the position of the scoop or the dredger shovel, respectively, relative to a reference point on the dredger itself.

In view of this state of the art, it is an object of the present invention to improve a depth measuring apparatus of the type defined above in such a manner that it enables the depth of the dredger scoop relative to the reference level to be determined by a simple measuring process and with reliable measuring results.

This object is attained according to the invention by a depth measuring apparatus of the type defined in the introduction, wherein said receiver is operative to determine the relative position of the radiation establishing said reference level with respect to said receiver, and to generate a level signal indicative of said relative position, and wherein said evaluation circuit is operative to generate a signal indicative of the depth of the dredger scoop relative to said reference level from said inclination signal and said level signal.

In the depth measuring apparatus according to the invention, the receiver for the radiation establishing a reference level does not as in prior art serve only for calibrating the measuring apparatus and for merely generating a signal indicative of the fact that the dredger arm at the location of the receiver is positioned at the reference level, but does in fact continuously generate a level signal indicative of the relative position of the receiver with respect to the reference level established by the radiation. According to the invention, by combining of such a level signal with an inclination signal indicative of the inclination of a dredger arm portion associated with the dredger scoop, the evaluation circuit is effective to generate a signal indicative of the depth of the dredger scoop relative to the reference level. Due to this fact, the depth measuring apparatus according to the invention continually indicates the true dredging depth, so that displacements of the dredge from its calibration posture will no longer result in measuring errors.

In an advantageous embodiment of the depth measuring apparatus according to the invention the receiver comprises a plurality of receiving units disposed substantially vertically above one another. A receiver of this type generates a digital or quasi-analogue output signal for indicating which of the receiving units of the receiver senses the radiation establishing the reference plane at the actual position of the dredger arm. A receiver of this type offers the substantial advantage that it permits the employ of commercially available receiving units such as phototransistors, photocells or light-sensitive diodes for generating the desired quasi-analogue or digital level signal.

In the advantageous embodiment of the depth measuring apparatus according to another invention, the evaluation circuit is operative to derive the cosine function of the inclination signal generated by the inclination sensor for obtaining a value representing the inclination-dependent influence of the length of the dredger arm portion associated to the dredger scoop on the actual depth of the scoop. On the basis of this value the evaluation circuit calculates the actual depth by combination with the level signal.

Another embodiment of the depth measuring apparatus according to the invention results in a particularly simple construction of the evaluation circuit. The described structure for the interconnection of the individual receiving units with the evaluation circuit permits the operative condition of a great number of receiving units to be monitored by using only two signal inputs of the evaluation circuit. Each receiving unit is adapted to be selectively commutated to one of two signal inputs of the evaluation circuit by means of an associated commutator element. Depending on the operative condition of the commutator elements, part of the number of receiving elements may thus be connected in parallel to a first signal input, while the remainder of the receiving units is connected, likewise in parallel, to the other signal input of the evaluation circuit. Successive commutation of the receiving units from one signal input to the other results in a change of the input singals applied to the evaluation circuit on commutation of the receiving unit actually sensing the radiation establishing the reference level. At this moment, therefore, the control signal for actuating the respective commutator element represents a value from which the position of the respective receiving unit within the receiver and thus the level signal may be directly derived. A further advantage of this form of the structure of the depth measuring apparatus resides in the fact that the evaluation circuit may be embodied in a commercially available microcomputer.

Of particular advantage is an embodiment of the depth measuring apparatus according to the invention in which the commutator elements are controlled via a hold circuit and a multiplexer circuit connected to the output side thereof, the hold circuit itself being again controlled by a microcomputer. The selestion of any commutator element may be carried out in this circuit arrangement with the aid of a serial data word appearing at a microcumputer output connected to the hold circuit.

A particularly reliable and accurate depth measurement may by achieved by the employ of an inclination sensor.

The employ of the laser transmitter for establishing a reference level ensures narrow focusing of the radiation and thus permits the dredge equipped with the depth measuring apparatus to operate practically anywhere on an extensive construction site irrespective of the point of installation of the laser transmitter.

A further embodiment of the depth measuring apparatus is the provision that the evaluation circuit takes into account not only the angle of inclination of the dredger arm portion associated with the scoop, but also the length of the dredger arm between the receiver and the scoop point, which may vary in different types of dredgers.

A preferred embodiment of the depth measuring apparatus according to the invention shall now be described by way of example with reference to the accompanying drawings, wherein.

Figure 1:
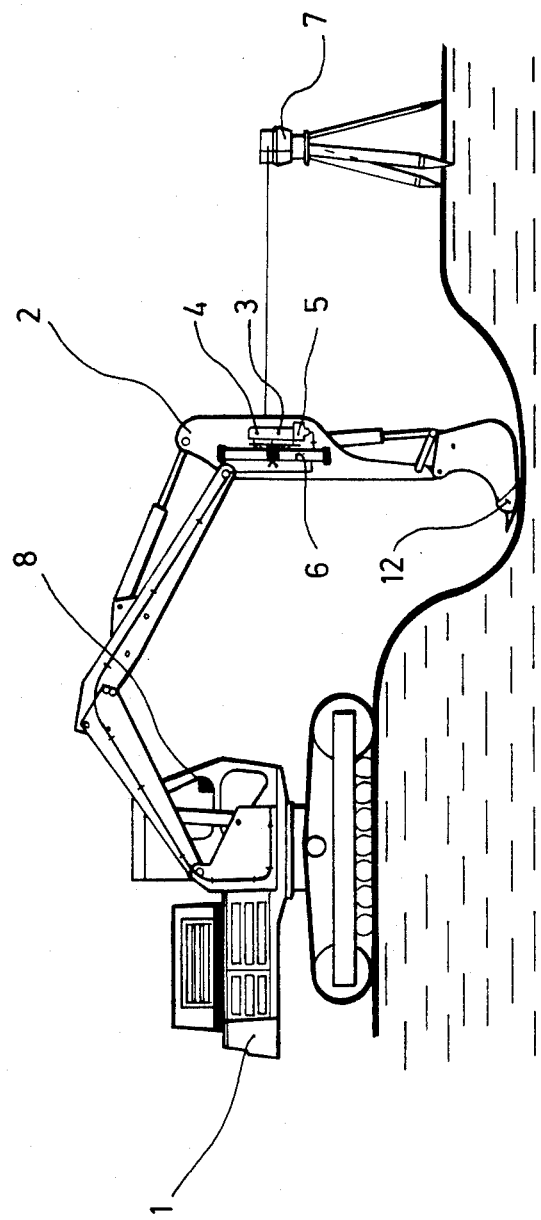
FIG. 1 shows a dredger equipped with a depth measuring apparatus.

Shown in FIG. 1 is a dredger 1 having a dredger arm 2 consisting of several parts. Mounted on dredger arm 2, preferably on a dredger arm portion associated with the dredger scoop, is a depth measuring apparatus 3 carried by a carrier tube 6 for vertical displacement therealong, the carrier tube itself being rigidly secured to dredger arm 2. Depth measuring apparatus 3 comprises a receiver 4 and an inclination sensor 5 for measuring the inclination of the dredger arm relative to the vertical. Receiver 4 serves for receiving a radiation generated by a laser transmitter 7 for establishing a reference plane at a reference level.

The laser transmitter includes a laser element for emitting a laser beam and rotating about a vertical axis, so that the rotation of the laser beam extending perpendicular to this axis results in a reference plane being established. The laser beam usually rotates at a speed of about 10 revolutions per second.

Figure 2:
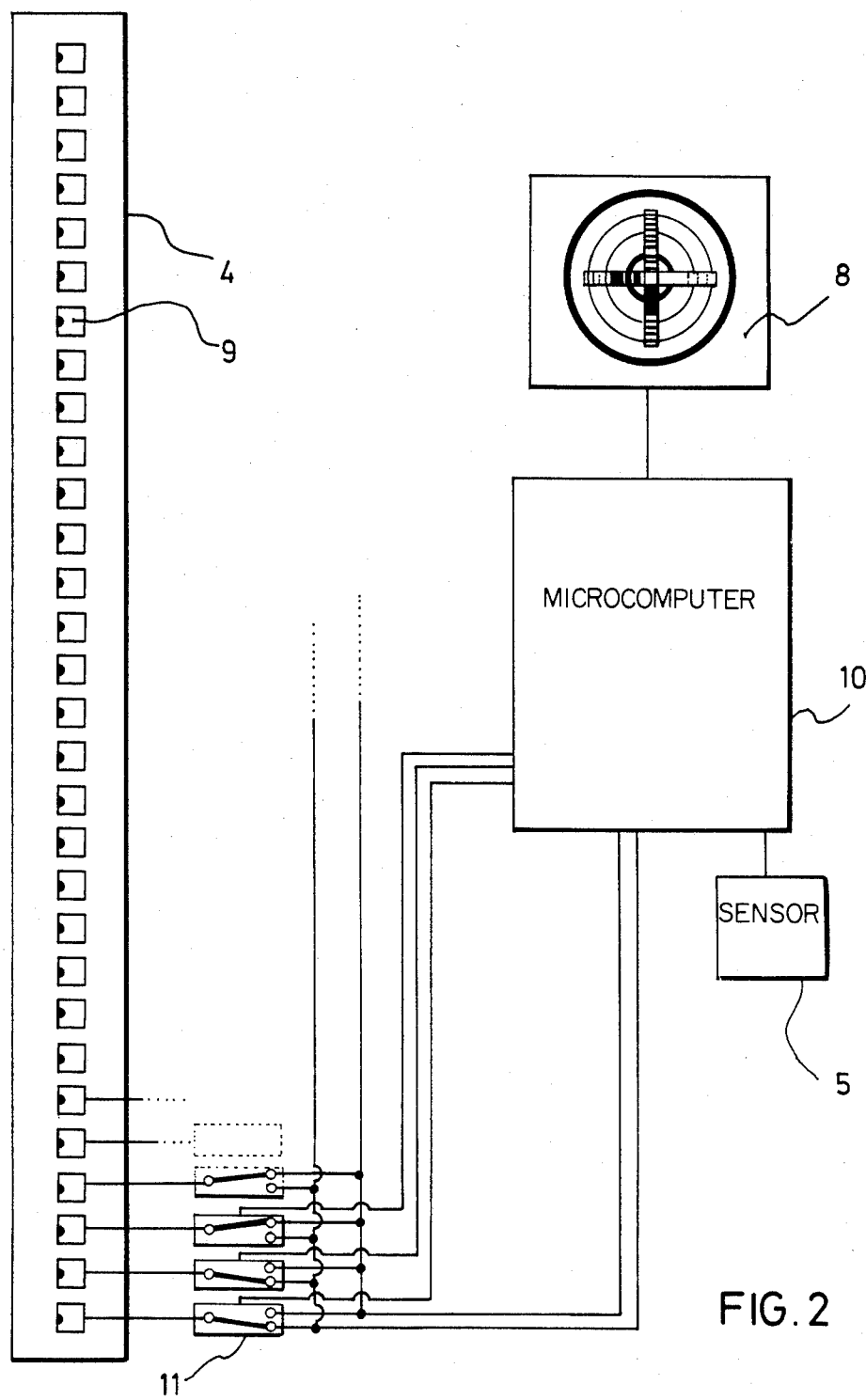
FIG. 2 shows a block diagram of the depth measuring apparatus.

FIG. 2 shows a block diagram of depth measuring apparatus 3. Receiver 4 includes a plurality of receiving units 9, the number of which preferably lies between twenty and one hundred. Receiving units 9 are disposed vertically above one another. Each receiving unit may be in the form of a phototransistor, a photocell or a light-sensitive diode.

A receiving unit may likewise be formed by a photo resistor. If the individual receiving units are disposed solely in a single plane, as is the case in the receiver 4 shown in FIG. 2, the receiver is only able to sense radiation impinging perpendicularly onto the receiving units within an angular range of about 180°. If it is intended, however, to sense the radiation from all directions, it is preferred to employ three groups of receiving units of the type shown in FIG. 2 at angular spacings of 120° therebetween, in which case the receiving elements disposed at a common level should be interconnected in parallel.

Each receiving unit, or in the case that three groups of receiving units are employed, each set of three parallel-connected receiving units, is adapted to be commutated to one of two signal inputs of an evaluation circuit 10 by means of an associated commutator element 11. The commutator elements 11 are preferably in the form of electronic switching elements, particularly semiconductor switching elements.

Each commutator element 11 is further connected to evaluation circuit 10 by a control conductor, so that the switching condition of commutator elements 11 is suitably controlled by evaluation circuit 10.

Proceeding from an initial switching condition, in which the upper half of the number of receiving elements 9 is commutated to a first signal input, and the other half of the number of receiving units 9 is commutated to a second signal input of evaluation circuit 10, the latter successively causes one receiving unit 9 after the other to be commutated from one of the signal inputs to the other. As an output signal is only generated by the receiving unit actually sensing the laser beam of laser transmitter 7, such commutation of the receiving units 9 results in a change of the signals applied to the signal inputs of evaluation circuit 10 only when the receiving unit 9 actually sensing the laser radiation is commutated from one signal input to the other. This change of signal at the inputs of evaluation circuit 10 is thus indicative of the fact that the control signal emitted at this instant is, or was, effective to actuate the commutator element 11 associated with the receiving unit located at the level of the reference plane established by the radiation of laser transmitter 7.

The control signal actuating the commutator element 11, the commutation of which results in said change of the signals applied to the signal inputs, is used by the evaluation circuit for the generation of a level signal, i.e. of a signal indicating the relative position of the respective receiving unit with respect to the reference plane established by the laser radiation. This level signal may for instance indicate the serial number of the respective receiving unit or the position it assumes within the receiver 4.

Evaluation circuit 10 preferably includes a commercially available microcomputer for instance of the type "Intel 8031". Since microcomputers of this type have only a limited number of signal outputs for the execution of control functions, there is provided a circuit connected between a serial signal output and the individual commutator elements 11 and adapted to derive the control signals for respective commutator elements 11 from a serial data output word of the microcomputer. In a preferred embodiment, this circuit comprises an 8 bit hold circuit or latch for instance of the type "Intel 4033" to which the data output word is applied from the signal output of the microcomputer. This 8 bit hold circuit has eight output terminals at which the data word serially emitted by the microcomputer appears in parallel represenation. The 8 bit word at the eight data terminals of the hold circuit serves for controlling a commercially available multiplexer circuit for instance of the type "Intel 4053" (not shown) effective to control the commutatot elements 11 by applying a high or low potential, respectively, to the control inputs thereof.

Also connected to evaluation circuit 10 is an inclination sensor 5. If a microcomputer is employed as the central control unit of evaluation circuit 10, an analogue-digital converter has to be connected between the inclination sensor 5 and the microcomputer. The inclination sensor 5 is preferably an electrolyte sensor the output signal of which is indicative of the posture of the electrolyte sensor with respect to the vertical. Commercially available electrolyte posture sensors have a central electrode and a pair of lateral electrodes between which the electrolyte forms a posture-responsive resistance. Depending on the posture of the electrolyte sensor the resistance between the center electrode and one of the lateral electrodes varies relative to the resistance between the center electrode and the other lateral electrode. This relative resistance variation can be detected by means of an alternating current bridge circuit. By suitably selecting the geometry of the electrolyte sensor it is possible to achieve a linear proportion between the resistance variation resulting in a corresponding output signal of the A.C. bridge circuit and the angle of inclination of the electrolyte sensor with respect to the vertical.

The microcomputer of evaluation circuit 10 is operative to derive the cosine function of the inclination angle from the inclination signal representing this angle and to multiply this value with a constant representing the length of dredger arm 2 between receiver 4 and scoop tip 12.

For reducing or eliminating the influence of surge waves on the inclination signal, the electrolyte in the electrolyte sensor may be selected to have a sufficiently high viscosity for suppressing oscillations of the electrolyte in the electrolyte sensor, or the electrolyte sensor may be connected to the microcomputer through a time constant circuit. Usually it will be preferred to employ an RC circuit for smoothing the inclination signal.

The signal derived in the above described manner from the cosine function of the inclination signal and a value representing the length of the dredger arm is combined with the level signal so as to obtain a signal representing the depth of the tip of the dredger scoop relative to the reference level. This depth-indicating signal is supplied to a display unit 8. The inclination signal is likewise supplied to display unit 8. Display unit 8 preferably comprises two rows of light emitting diodes extending perpendicular to one another, the vertical row serving for displaying the signal representing the depth of the dredger scoop, while the horizontally extending row of light emitting diodes displays the inclination signal. For many uses it may be sufficient to display only the depth-indicating signal, so that the horizontal row of light-emitting diodes may be omitted.

The display unit may alternatively comprise a numeric display panel or a pointer display instrument. In a practical embodiment of a display unit 8 with rows of light-emitting diodes, the magnitude of a measuring unit associated to a display graduation unit, i.e. the depth increments from the lighting up of one light-emitting diode to the lighting up of the next such diode, may be arbitrarily selected. In this manner it is possible to adapt the indicated measuring range in a given situation to the required accuracy in determining the depth of the dredger scoop.

As explained above, the cosine function derived from the inclination signal is multiplied by a value representing the length of the dredger arm or the scoop shaft, respectively, between the receiver and the scoop. This value varies from one dredger to the next. It would now be possible to measure the length of the respective dredger arm or scoop shaft and to store the obtained value in the microcomputer through a respective data input. This method is not desirable, however, in view of simple operability and functional reliability. For this reason the microcomputer included in evaluation circuit 10 contains a suitable program for automatically determining the length of the dredger arm or scoop shaft, respectively. To this purpose the dredger arm portion closest to the scoop, i.e. the scoop shaft, is brought to a vertical position and lowered onto a plane ground surface. The receiver 4 is then adjusted along its carrier tube 6 until the laser beam is sensed by the lowermost receiving unit 9. After this adjustment has been attained, a calibration pushbutton is actuated for storing this starting condition in the evaluation circuit 10 or its microcomputer, respectively. While still resting on the plane ground surface, the scoop shaft is subsequently inclined until the laser beam is sensed by the uppermost receiving unit 9, whereupon the calibrating pushbutton is again actuated, causing evaluation circuit 10 to measure the angle of the scoop shaft in this position. As the level difference between the uppermost and the lowermost receiving units is a known constant, the length of the scoop shaft from the scoop to the receiver may be calculated from the measured angle. The length to be determined equals the height between the lowermost and the uppermost receiving unit divided by the difference of one minus the cosine function of the measured angle. The thus determined length of the scoop shaft is stored in the microcomputer as the required constant. As an alternative to the embodiment described by way of example, the evaluation circuit may also be an analogue circuit.

The depth measuring apparatus according to the invention may also be employed for dredgers having a dredger arm consisting of more than two parts, in which case the receiver has to be mounted on the outermost part of the dredger arm associated with the scoop and/or additional inclination sensors have to be provided for the additional parts of the dredger arm.

In the place of a receiver generating a digital output signal, it is likewise possible to employ a receiver generating an analogue output signal.

Instead of employing the cosine function of the inclination signal for calculating the depth from the inclination signal and the level signal, it is also possible to employ a function of the inclination signal merely approximating the cosine function.

We claim:

1. A depth measuring apparatus for a dredger having an arm and an attached scoop, comprising an inclination sensor mounted on the dredger arm for generating an inclination signal indicative of the inclination of the dredger arm,
   - a receiver, fixedly secured to the dredger arm, for a radiation transmitter establishing a reference level and said receiver comprising a plurality of receiving units disposed at different levels one above another each to generate an output level signal when impinged by a radiation, and an evaluation circuit connected to said receiver and said inclination sensor, wherein said receiver is operative by its receiving units to determine the relative vertical position of the radiation establishing said reference level with respect to said receiver, and to generate said output level signal indicative of said relative position, and
   - wherein said evaluation circuit is operative to generate a signal indicative of the depth of the dredger scoop relative to said reference level from said inclination signal and said level signal.

2. A depth measuring apparatus according to claim 1, wherein said evaluation circuit is operative to combine with said output level signal a value derived from said inclination signal by the cosine function.

3. A depth measuring apparatus according to claim 1, wherein each receiving unit is associated to a commutator element operative to commutate said receiving unit to one of two signal inputs of said evaluation circuit,
   - wherein said commutator elements are connected to control signal outputs of said evaluation circuit,
   - wherein said evaluation circuit is operative to control said commutator elements for successively commutating said receiving units from its first signal input to its second input until it senses a change of the signals applied to the two signal inputs, and
   - wherein said output level signal is derived from the position of the receiving unit the commutation of which results in a change of the signals applied to the signal inputs.

4. A depth measuring apparatus according to claim 3, wherein said inclination sensor is embodied in an electrolyte sensor.

5. A depth measuring apparatus according to claim 2, wherein said evaluation circuit is operative to multiply said value derived by the cosine function from said inclination signal by a value corresponding to the length of said dredger arm between said receiver and the scoop tip, and to combine this value with the level signal.

* * * * *